US009614675B2

(12) United States Patent
Georgiev et al.

(10) Patent No.: US 9,614,675 B2
(45) Date of Patent: Apr. 4, 2017

(54) METHODS, APPARATUS, AND ARTICLES OF MANUFACTURE TO ENCODE AUXILIARY DATA INTO TEXT DATA AND METHODS, APPARATUS, AND ARTICLES OF MANUFACTURE TO OBTAIN ENCODED DATA FROM TEXT DATA

(71) Applicant: The Nielsen Company (US), LLC, Schaumburg, IL (US)

(72) Inventors: Nikolay Georgiev, San Jose, CA (US); Leonid Ayzenshtat, Jacksonville, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/705,595

(22) Filed: May 6, 2015

(65) Prior Publication Data

US 2015/0236854 A1     Aug. 20, 2015

Related U.S. Application Data

(63) Continuation of application No. 13/691,510, filed on Nov. 30, 2012, now Pat. No. 9,042,554.

(51) Int. Cl.
*G06F 21/00*     (2013.01)
*H04L 9/30*      (2006.01)
*G06F 21/64*     (2013.01)

(52) U.S. Cl.
CPC ............... *H04L 9/30* (2013.01); *G06F 21/64* (2013.01); *H04L 2209/34* (2013.01)

(58) Field of Classification Search
None
See application file for complete search history.

(56) References Cited

U.S. PATENT DOCUMENTS

| 4,906,991 | A |  3/1990 | Fiala et al. |
| 5,239,298 | A |  8/1993 | Wei |
| 5,727,092 | A |  3/1998 | Sandford, II et al. |
| 5,937,066 | A |  8/1999 | Gennaro et al. |
| 5,970,140 | A | 10/1999 | Sandford, II et al. |
| 6,021,196 | A |  2/2000 | Sandford, II et al. |

(Continued)

OTHER PUBLICATIONS

IP Australia, "Patent Examination Report No. 2," issued in connection with Application No. 2013204220, Jun. 4, 2015, 2 pages.

(Continued)

*Primary Examiner* — Dao Ho
*Assistant Examiner* — Andrew Steinle
(74) *Attorney, Agent, or Firm* — Hanley, Flight & Zimmerman, LLC

(57) ABSTRACT

Methods, apparatus, and articles of manufacture to encode auxiliary data into text data and methods, apparatus, and articles of manufacture to obtain encoded data from text data are disclosed. An example method includes assigning encoded data units to respective ones of a plurality of groups, the encoded data units including text data, identifying a symbol present in a first one of the encoded data units assigned to a first one of the groups, and outputting auxiliary data embedded in the encoded data units based on the symbol and based on the one of the groups of the first one of the encoded data units.

28 Claims, 8 Drawing Sheets

(56) References Cited

U.S. PATENT DOCUMENTS

| | | | |
|---|---|---|---|
| 6,044,155 | A | 3/2000 | Thomlinson et al. |
| 6,065,119 | A * | 5/2000 | Sandfrr, II ........... G06F 21/64 726/22 |
| 6,174,170 | B1 | 1/2001 | Olmedo |
| 6,289,128 | B1 | 9/2001 | Allen |
| 6,353,672 | B1 | 3/2002 | Rhoads |
| 6,778,682 | B2 | 8/2004 | Rhoads |
| 7,164,778 | B1 | 1/2007 | Nakamura et al. |
| 7,197,156 | B1 | 3/2007 | Levy |
| 7,424,132 | B2 | 9/2008 | Rhoads |
| 7,617,231 | B2 | 11/2009 | Moon et al. |
| 7,730,037 | B2 | 6/2010 | Jajodia et al. |
| 8,073,915 | B1 | 12/2011 | Nandy |
| 8,082,320 | B1 | 12/2011 | Moorer |
| 8,701,119 | B1 * | 4/2014 | Ross ..................... G06F 9/5066 707/755 |
| 9,042,554 | B2 | 5/2015 | Georgiev et al. |
| 2001/0046298 | A1 * | 11/2001 | Terada .................. G06T 1/0021 380/252 |
| 2003/0014634 | A1 | 1/2003 | Petrovic |
| 2003/0217272 | A1 | 11/2003 | Agrawal et al. |
| 2004/0143742 | A1 | 7/2004 | Muratani |
| 2005/0039021 | A1 * | 2/2005 | Alattar ................ G06F 17/2294 713/176 |
| 2005/0055554 | A1 | 3/2005 | Sion et al. |
| 2007/0110237 | A1 * | 5/2007 | Tehranchi ............. G06T 1/0035 380/201 |
| 2009/0115576 | A1 | 5/2009 | Schuessler |
| 2011/0055166 | A1 | 3/2011 | Stephenson et al. |
| 2011/0246505 | A1 * | 10/2011 | Jung ................. G06F 17/30091 707/769 |
| 2012/0030546 | A1 | 2/2012 | Alattar et al. |
| 2012/0192059 | A1 | 7/2012 | Laskaris et al. |
| 2014/0153715 | A1 | 6/2014 | Georgiev et al. |
| 2014/0157439 | A1 | 6/2014 | Ayzenshtat et al. |
| 2014/0157440 | A1 | 6/2014 | Georgiev et al. |
| 2014/0157441 | A1 | 6/2014 | Georgiev et al. |
| 2015/0261943 | A1 | 9/2015 | Georgiev et al. |

OTHER PUBLICATIONS

IP Australia, "Notice of Acceptance," issued in connection with Application No. 2013204619, Jun. 3, 2015, 2 pages.

United States Patent and Trademark Office, "Advisory Action", issued in connection with U.S. Appl. No. 13/691,515, Jun. 17, 2015, 12 pages.

IP Australia, "Notice of Acceptance," issued in connection with Application No. 2013204226, Jun. 26, 2015, 2 pages.

Nielsen/IRI Intro Session, retrieved from http://faculty.gugua.duke.edu/~moorman/GeneralMills/Sectionl/Julie%20Beattie%20Nielsen.ppt (38 pages).

Richard LoPinto, "Color Choice: Luminance, Chrominance and Hue: Among the tools at your disposal, the LCH Editor gives you a powerful weapon for finessing the color relationships in your images", Digital Photo Pro, Mar. 3, 2008, retrieved from http://www.digitalphotopro.com/technique/software-technique/color-choice-luminance-chrominance-and-hue.html?start=2 (2 pages).

Dr. Vipula Singh, "Digital Watermarking: A Tutorial", Cyber Journals: Multidisciplinary Journals in Science and Technology, Journal of Selected Areas in Telecommunications (JSAT), Jan. Edition, 2011, retrieved from http://www.cyberjournals.com/Papers/Jan2011/02.pdf (12 pages).

Jessica Codr, "Unseen: An Overview of Steganopgraphy and Presentation of Associated Java Application C-Hide", retrieved from http://www.cse.wustl.edu/~jain/cse571-09/ftp/stegano/index.html, (22 pages).

Gary C. Kessler, "Steganography: Hiding Data Within Data", Sep. 2001, retrieved from http://www.garykessler.net/library/steganography.html (5 pages).

Alaa Jebran, "Text 2Text Steganography-Part 2", Code Project, Jun. 19, 2007, retrieved from http://www.codeproject.com/Articles/19260/Text-2Text-Steganography-Part-2 (8 pages).

TextMark-Protect you texts with digital watermarks!, retrieved from http://www.compris.com/TextMark/en/index.html (3 pages).

Matthew Kwan, "Whitespace steganography", The SNOW Home Page, Dec. 19, 2009, retrieved from http://www.darkside.com.au/snow/index.html (2 pages).

Simple text watermarking with Unicode, coderrr, Mar. 23, 2008, retrieved from http://codern.wordpress.com/2008/03/23/simple-text-watermarking-with-unicode/ (4 pages).

Topkara et al., "Natural Language Watermarking", retrieved from http://homes.cerias.purdue.edu/~mercan/spie05_5681-45_paper.pdf (12 pages).

Permutations, Variations & Combinations, http://users.telenet.be/vdmoortel/dirk/Maths/PermVarComb.html (1 page).

Richard Ishida, "Unicode controls vs. markup for bidi support", W3C Internationalization, Jun. 6, 2003, retrieved from http://users.telenet.be/vdmoortel/dirk/Maths/PermVarComb.html (5 pages).

How to protect digital works: images, photos and documents: comparison of watermarking methods and tools, retrieved from http://www.watermarker.com/how-to-protect-digital-images.aspx (2 pages).

Manage, monitor and monetize your digital photos, images and artwork, Digimarc for Images, retrieved from http://www.digimarc.com/digimarc-for-images (2 pages).

How safe is Excel encryption. Is it really secure?, Linker It Software, retrieved from http://www.oraxcel.com/projects/encoffice/help/How_safe_is_Excel_encryption.html (3 pages).

How secure is Microsoft Word 2007 encryption, Linker It Software, retrieved from http://www.oraxcel.com/projects/encoffice/help/How_safe_is_Word_2007_encryption.html (3 pages).

MS Office Password Recovery Software, Rixler Software, retrieved from http://www.rixler.com/ms_office_password_recovery_software.htm (1 page).

Stellar Phoenix Office Password Recovery Pro, Office Password Recovery Pro, retrieved from http://www.officepasswordrecover.com/ (2 pages).

Tim Fisher, "3 Free Word Password Recovery Tools: Free Word Password Recovery, Remover, and Unlocker Tools for Windows", About.com, retrieved from http://pcsupport.about.com/od/toolsofthetrade/tp/word-password-recovery.htm (2 pages).

Wayback Machine Cache of "http://www.easypasswordfix.com" taken on Feb. 7, 2011. (2 pages).

Erik Kangas, "The Light of Knowledge", LuxSci FYI Blog, retrieved from http://luxsci.com/blog/how-secure-are-password-protected-files.html (2 pages).

Password strength, Wikipedia, retrieved from http://en.wikipedia.org/wiki/Password_strength (10 pages).

Amit Agarwal, "How to Open Password Protected PDF Documents", Digital Inspiration, retrieved from http://labnol.blogspot.com/2007/01/how-to-open-password-protected-pdf.html (2 pages).

Pavel Semjanov, "How to remove security from secured PDF file", GuaPDF, Jul. 13, 2012, retrieved from http://www.guapdf.com/ (6 pages).

Ali Hanyaloglu, "Digitally Signing PDF Documents Using Adobe Acrobat 9*: An Introduction", ScanSnap Community, Nov. 16, 2009, retrieved from http://scansnapcommunity.com/tips-tricks/1416-digitally-signing-pdf-documents-using-adobe-acrobat-9-an-introduction/ (9 pages).

Information Rights Management in Office 2010. Accessed from "http://office.microsoft.com/en-us/excel-help/information-rights-management-in-office-2010-HA010354260.aspx" on Nov. 30, 2012. (5 pages).

Geoff Anderson, "What is: Information Rights Management?", retrieved from http://office.microsoft.com/en-us/excel-help/information-rights-management-in-office-2010-HA010354260.aspx (3 pages).

Adobe LiveCycle Rights Management ES3, Adobe, retrieved from http://www.adobe.com/products/livecycle/rightsmanagement/ (3 pages).

The benefit of rights management: A guide to Adobe® LiveCycle® Rights Management ES software, Adobe, retrieved from http://www.adobe.com/products/livecycle/pdfs/95010482_lc_rightsmgmt_wp_ue.pdf (8 pages).

(56) References Cited

OTHER PUBLICATIONS

PDF DRM, Security and Rights Management Systems, Armjisoft, retrieved from http://www.armjisoft.com/?page=pdfownerguard (4 pages).
PDF Protection, Control & Tracking, Vitrium Systems, retrieved from http://www.vitrium.com/ (4 pages).
Products and solutions, codeandsoft, retrieved from http://www.codeandsoft.com/ (1 pages).
Document Security—Digital Rights Management (DRM) & Copy Protection Software, LockLizard, retrieved from http://www.locklizard.com/ (2 pages).
Rights Management for Standard Document Formats, FileOpen Document Security Blog, retrieved from http://www.fileopen.com/blog/ (4 pages).
Lip Yee Por, KokSheik Wong, and Kok Onn Chee. "UniSpaCh: A text-based data hiding method using Unicode space characters." The Journal of Systems and Software 85 (May 2012) pp. 1075-1082.
Bender, et al. "Techniques for Data Hiding," IBM Systems Journal, vol. 35, Nos. 3&4, 1996. pp. 313-336.
United States Patent and Trademark Office, "Non-Final Office Action," issued in connection with U.S. Appl. No. 13/691,519, Jul. 16, 2014, 46 pages.
Tzouramanis, "A Robust Watermarking Scheme for Relational Databases," Dec. 2011, 4 pages.
United States Patent and Trademark Office, "Non-Final Office Action," issued in connection with U.S. Appl. No. 13/691,515, Jul. 28, 2014, 32 pages.
Kamel et al., "A Lightweight Data Integrity Scheme for Sensor Networks," 2011.
Qin et al., "Watermark Based Copyright Protection of Outsourced Database," 2006.
United States Patent and Trademark Office, "Non-Final Office Action," issued in connection with U.S. Appl. No. 13/691,510, Jul. 18, 2014, 27 pages.
United States Patent and Trademark Office, "Non-Final Office Action," issued in connection with U.S. Appl. No. 13/691,522, Aug. 15, 2014, 27 pages.
IP Australia, "Patent Examination Report No. 1," issued in connection with Application No. 2013204220, Jul. 25, 2014, 3 pages.
IP Australia, "Patent Examination Report No. 1," issued in connection with Application No. 2013204619, Aug. 28, 2014, 3 pages.
IP Australia, "Patent Examination Report No. 1," issued in connection with Application No. 2013204226, Dec. 17, 2014, 4 pages.
IP Australia, "Patent Examination Report No. 1," issued in connection with Application No. 2013204479, Dec. 12, 2014, 4 pages.
United States Patent and Trademark Office, "Final Office Action," issued in connection with U.S. Appl. No. 13/691,515, Mar. 3, 2015, 69 pages.
United States Patent and Trademark Office, "Notice of Allowance", issued in connection with U.S. Appl. No. 13/691,510, mailed on Jan. 20, 2015, 21 pages.
United States Patent and Trademark Office, "Notice of Allowance", issued in connection with U.S. Appl. No. 13/691,522, mailed on Mar. 30, 2015, 23 pages.
United States Patent and Trademark Office, "Supplemental Notice of Allowability", issued in connection with U.S. Appl. No. 13/691,510, mailed on Apr. 2, 2015, 9 pages.
United States Patent and Trademark Office, "Supplemental Notice of Allowability", issued in connection with U.S. Appl. No. 13/691,510, mailed on May 1, 2015, 9 pages.
IP Australia, "Notice of Acceptance," issued in connection with Application No. 2013204220, Jul. 23, 2015, 2 pages.
United States Patent and Trademark Office, "Non-Final Office Action", issued in connection with U.S. Appl. No. 13/691,515, mailed on Apr. 21, 2016, 32 pages.

\* cited by examiner

| | | N = 0x4E | | | C = 0x43 | | | D = 0x44 | | |
|---|---|---|---|---|---|---|---|---|---|---|
| | | 0 | 1 | 0 | 0 | 1 | 1 | 1 | 0 | 0 ... |

| Source Data | G7 | G6 | G5 | G4 | G3 | G2 | G1 | G0 | Encoded Data |
|---|---|---|---|---|---|---|---|---|---|
| Advantage Sales & Marketing | | | x | | | | | | Advantage°Sales°&°Marketing |
| Allied Beverage Group LLC | | x | | | | | | | Allied°Beverage Group LLC |
| Coors Brewing Co 2 | | | | x | | | | | Coors°Brewing°Co 2 |
| Diageo-Moved to ETL client | | | | | x | | | | Diageo-Moved to°ETL°client |
| Francis Ford Coppola Presents | | | | | | | x | | Francis°Ford°Coppola°Presents |
| Fresh and Easy Market | | | | x | | | | | Fresh and°Easy°Market |
| ICOM Info & Comm. | | | x | | | | | | ICOM Info°&°Comm. |
| InStore Broadcast Network Inc | | | | | | x | | | InStore°Broadcast°Network Inc |
| IPC -- Florida Calls | x | | | | | | | | IPC°--°Florida°Calls |
| IPC -- Quik Trip | | | | | | x | | | IPC°--°Quik Trip |
| IPC -- Zagat Survey | | | | | | | | x | IPC°--°Zagat°Survey |
| National Wine & Spirits | | | | | | | | x | National Wine°&°Spirits |
| Time Warner Retail Sales | | | | | | | x | | Time°Warner°Retail°Sales |
| Tmp Client For Testing 2 | | x | | | | | | | Tmp°Client For Testing 2 |
| Wirtz Beverage Group NV | | | | | | x | | | Wirtz Beverage°Group NV |
| X Span Results Inc | x | | | | | | | | X°Span Results Inc |

FIG. 6

METHODS, APPARATUS, AND ARTICLES OF MANUFACTURE TO ENCODE AUXILIARY DATA INTO TEXT DATA AND METHODS, APPARATUS, AND ARTICLES OF MANUFACTURE TO OBTAIN ENCODED DATA FROM TEXT DATA

RELATED APPLICATIONS

This patent arises from a continuation of U.S. patent application Ser. No. 13/691,510, filed Nov. 30, 2012 (now U.S. Pat. No. 9,042,554). The entirety of U.S. patent application Ser. No. 13/691,510 is incorporated herein by reference.

FIELD OF THE DISCLOSURE

This disclosure relates generally to data encoding, and, more particularly, to methods, apparatus, and articles of manufacture for encoding auxiliary information in text data and to methods, apparatus, and articles of manufacture for obtaining encoded auxiliary information from text data.

BACKGROUND

Proprietary data is sometimes shared between two parties. In some cases, the proprietary data owned by one party is easily copied or distributed by the other party to additional parties without consent of the owner.

BRIEF DESCRIPTION OF THE DRAWINGS

FIG. 6 is a table illustrating another example of source data, auxiliary data, and resulting encoded data in accordance with the teachings of this disclosure.

DETAILED DESCRIPTION

Figure 1:
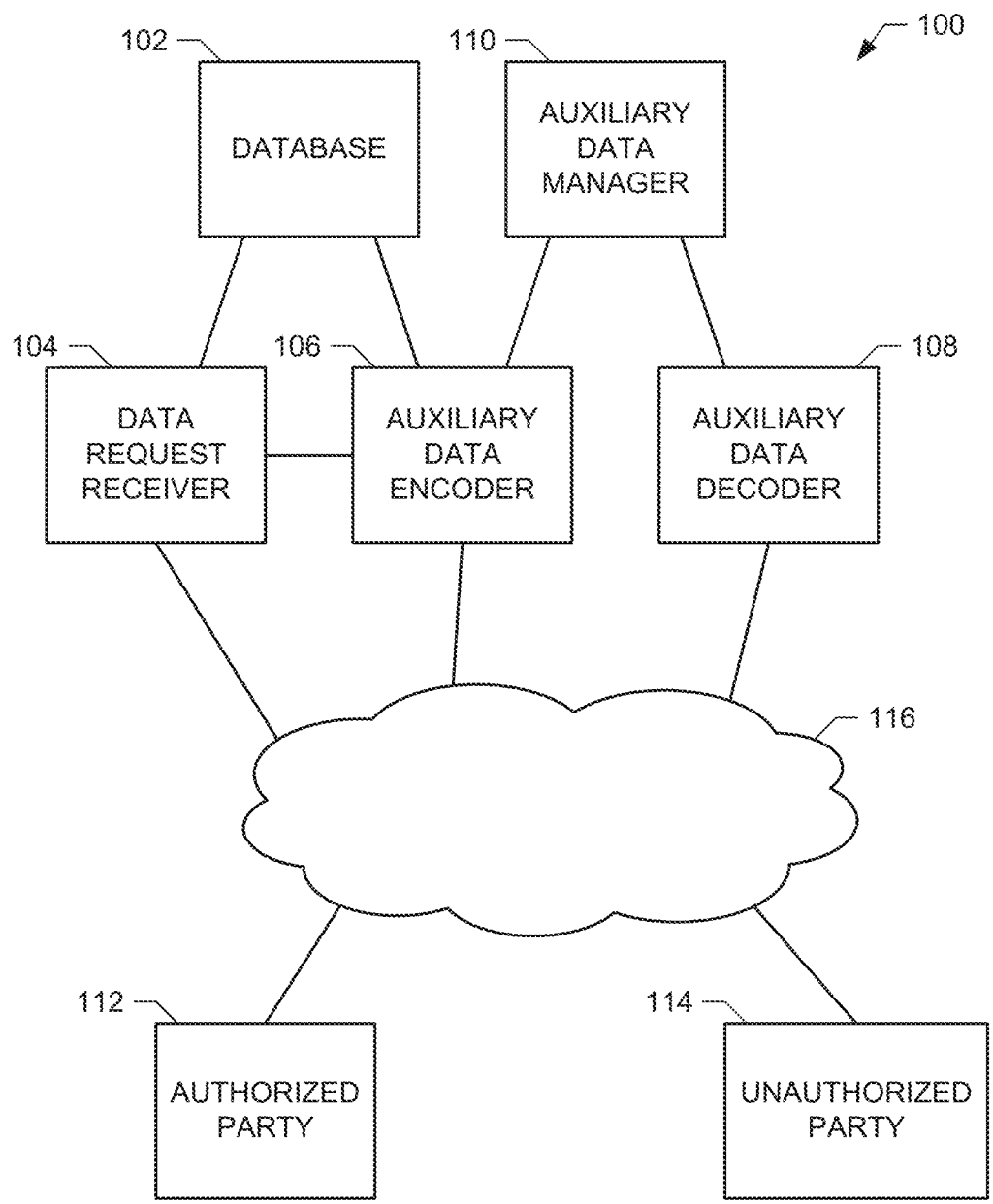
FIG. 1 is a block diagram of an example system in accordance with the teachings of this disclosure.

Data (whether copyrighted or not) can be distributed. However, once distributed a first time, the data is capable of being further distributed. Example methods, apparatus, and articles of manufacture disclosed herein enable an owner of data to uniquely identify, protect, and trace the data to detect cases of unauthorized copying or redistribution by embedding auxiliary data, also referred to herein as watermarks, in the data. In particular, example methods, apparatus, and articles of manufacture embed watermarks in the data in a robust manner, such that the watermark can still be recovered if a portion of the data is copied and/or if the data is reorganized.

Known text watermarking techniques allow embedding of information inside plain text. Some such techniques change font attributes (e.g., color and/or size), use misspelled words, rephrase text (e.g., using synonyms and narration tense), use ASCII whitespaces and tabs, use Unicode zero width characters, and/or use neuro-linguistic programming techniques. These known approaches are not well-suited for text data such as reference data including multiple, relatively small units of text data (e.g., 50 characters or less), because known techniques require a bigger corpus in order to encode the watermark data and/or negatively affect the quality of the protected data. Example methods, apparatus, and articles of manufacture disclosed herein provide an innovative approach for embedding watermarks inside alphanumeric data. Example methods, apparatus, and articles of manufacture disclosed herein may be used to robustly encode a watermark or other auxiliary data into text data or textual data. A disclosed example method to encode auxiliary information into text data includes assigning source data to one of a plurality of groups, the source data comprising text data, identifying a symbol to be added to the source data based on an assigned group of the source data, and generating encoded data by including in the source data a text character representative of the symbol.

An example method to obtain auxiliary information from encoded data includes assigning encoded data to one of a plurality of groups, the encoded data comprising text data, identifying a symbol present in the encoded data, and identifying auxiliary information embedded in the encoded data based on the symbol and based on an assigned group of the encoded data.

An example apparatus to encode auxiliary data into text data includes a data unit group assignor, a symbol group assignor, and a data unit encoder. The data unit group assignor assigns source data to one of a plurality of groups, the source data comprising text data. The symbol group assignor assigns a symbol to be added to the source data to the one of the plurality of groups. The data unit encoder generates encoded data by including in the source data a text character representative of the symbol. An example apparatus to obtain auxiliary information from encoded data includes a data unit group assignor, a symbol extractor, and an auxiliary data assembler. The data unit group assignor assigns encoded data to one of a plurality of groups, the encoded data comprising text data. The symbol extractor identifies a symbol present in the encoded data. The auxiliary data assembler identifies information embedded in the encoded data based on the symbol and based on an assigned group of the encoded data.

Example methods, apparatus, and articles of manufacture enable content owners to secure the distributed content, prevent unauthorized usage of the data, and/or provide the means to combat copyright infringement. Example methods, apparatus, and articles of manufacture can be used, for example, to embed a watermark into all distributed data. In the event of unauthorized distribution, the watermark in the text data can be decoded to prove the origin of the data. Example methods, apparatus, and articles of manufacture can also be used to embed a client specific fingerprint to personalize the copy of data. When data is found to have been improperly distributed, the specific fingerprint may be used to identify a party who was in possession of the data prior to the improper distribution.

By encoding data independently into each data unit of the text data based on a hash function or other algorithm, encoding carried out using the example methods, apparatus, and articles of manufacture disclosed herein is highly resilient against data shuffling, reordering and/or partial deletion of the data. Example methods, apparatus, and articles of manufacture disclosed herein use American National Standards Institute (ANSI)-compatible codes for the encoding scheme to desensitize the encoding against recopying data from and/or to different formats. Example methods, apparatus, and articles of manufacture disclosed herein insert a non-breaking white space character to replace a regular white space character (e.g., a white space character generated from a keyboard strike) within a data unit and/or at the end of a data unit, to preserve the quality and the searchability of the data. As used herein, a white space refers to a character encoding which, when decoded by a processing device, causes the processing device to generate a representation of a space devoid of an alphanumeric character or symbol on an output device. Example methods, apparatus, and articles of manufacture enable a lightweight implementation of the watermarking and little to no overhead in the encoded data relative to the source data.

In some examples, the text data is divided (or divisible) into data units. To encode auxiliary data into the text data, example methods, apparatus, and articles of manufacture determine symbols (e.g., bits) to represent the auxiliary data. Each symbol may be recovered by any data unit in a group of data units. Example methods, apparatus, and articles of manufacture apply a hash algorithm to each of the data units to assign each data unit to one of the groups. The data units are encoded with the symbol corresponding to the groups to which the data units are assigned.

In some examples, the encoding is robust because the auxiliary data can be recovered from a subset of the data set as long as the subset includes at least one data unit from each group.

In some examples, encoding a symbol into a data unit includes inserting a character into the text of the data unit. In some such examples, inserting the character is done at a particular location in the data (e.g., at the end). In some examples, inserting the character into the data units includes inserting the character such that the character is substantially invisible when the data units are presented for viewing to a user. In some examples, inserting the character includes replacing another character in the data unit with the character that represents the symbol. In some such examples, the replacement character is visually similar or identical to the replaced character when displayed in at least one user-readable format, but is represented by a different character encoding. In some examples, the text data does not need to be modified to represent the symbol (e.g., the text data is self-encoded).

Some programs are capable of visually displaying characters in the text data, and thus the characters are not necessarily invisible under all circumstances. However, the characters may be considered to be substantially invisible within the scope of this disclosure when the characters are not visible when displayed in at least one manner or format (e.g., in a print-type format, in a formatting-hidden format, etc.). Furthermore, different encodings of characters may be slightly different. For example, a first character encoding representative of a space may be wider or narrower than another character encoding of a space. In other words, different encodings of a blank or white space may result in different widths of blank or white space when displayed by some computer programs or devices. As used herein, two characters are considered to be similar when they represent the same alphanumeric character or non-alphanumeric symbol (e.g., white or blank spaces, hyphens, etc.), without regard to relative widths, heights, thicknesses, or other non-substantive differences.

As used herein, the term "text data" or "textual data" refers to data encoded to represent alphanumeric characters. Example encodings of alphanumeric characters include computer character encodings such as American Standard Code for Information Interchange (ASCII), Unicode, Extended Binary Coded Decimal Interchange Code (EBCDIC), International Organization for Standardization (ISO) 8859 (and parts of ISO 8859), Unicode Transformation Formats (UTF) (and its variants), and/or Windows code pages (also referred to as ANSI code pages). Many other character encodings exist and may be used to encode text data with auxiliary data in accordance with the teachings of this disclosure. Accordingly, the term "text data" may refer to any past, present, and/or future character encodings.

As used herein, "assigning" data or data units to a group may refer to a temporary and/or permanent assignment or association between the data or data unit and the group. For example, a data unit may be assigned to a group temporarily via logging the association between the data unit and the group for the purposes of encoding auxiliary data into the data unit. After the encoding, the example association may be discarded or stored. The term "assigning" is not intended to connote permanence of association between data and a group.

FIG. 1 is a block diagram of an example system 100. The example system 100 of FIG. 1 may be used to encode auxiliary information (e.g., watermarks) into text data that may subsequently be distributed. The example system 100 may further decode text data to recover or obtain auxiliary information encoded using the system 100. Thus, subsequent to distribution of the encoded text data, the example system 100 can identify text data that has been encoded using the system 100.

The example system 100 of FIG. 1 includes a database 102, a data request receiver 104, an auxiliary data encoder 106, an auxiliary data decoder 108, and an auxiliary data manager 110. In the example of FIG. 1, the database 102, the data request receiver 104, the auxiliary data encoder 106, the auxiliary data decoder 108, and the auxiliary data manager 110 are owned or controlled by a single party (e.g., an owner or licensee of distributable data, a distributor of the data under the control of the owner or licensee of the data, etc.). In some other examples, the database 102, the data request receiver 104, the auxiliary data encoder 106, the auxiliary data decoder 108, and/or the auxiliary data manager 110 may represent a combination of multiple parties. The example system 100 further includes a party 112 authorized to receive data stored in the database 102 and a party 114 not authorized to receive such data. Any or all of the example database 102, the example data request receiver 104, the example auxiliary data encoder 106, the example auxiliary data decoder 108, the auxiliary data manager 110, and/or the example parties 112, 114 may be communicatively connected via a network 116 such as the Internet.

Any of the example blocks 102-110 of FIG. 1 may be combined, divided, and/or rearranged to form different blocks that perform fewer or more functions.

As mentioned above, the example database 102 stores data that may be distributed. In the example system 100, the data stored in the database (also referred to herein as "source data") includes (or is divisible into) data units of text. In some examples, the text represents human-readable information and is stored using character encodings that can be interpreted by a receiver of data. In addition to the numeric value of the data unit, the data unit may include organizational data, metadata, and/or other types of non-substantive data for the purposes of organization, relation, and/or distribution. In some examples, the numeric value is the entirety of the data unit. Example data includes a table of text fields and associated information. The data stored in the database 102 may be updated to add new data, to modify data present in the database 102, and/or to delete data from the database 102.

The example data request receiver 104 of FIG. 1 receives requests for data stored in the database 102. For example, the data request receiver 104 may receive a request via the network (e.g., from the authorized party 112 and/or other parties). Additionally or alternatively, the data request receiver 104 may receive requests via manual entry of the request into the data request receiver (e.g., by a person via a user interface). The example data request receiver 104 parses the request to determine the data that was requested to be transferred and/or determines whether the requesting party has authorization to receive the data. For example, in response to a request the data request receiver 104 may construct a query of the database 102 to instruct the database and/or the auxiliary data encoder 106 which data is to be encoded before it is transmitted.

The example auxiliary data encoder 106 of FIG. 1 receives the source data to be encoded (e.g., as individual data units, as a set of data units, etc.), encodes auxiliary information into the source data, and outputs encoded data (e.g., for distribution, for storage, etc.). A more detailed example of the auxiliary data decoder 108 is described below in conjunction with FIG. 2.

The example auxiliary data decoder 108 of FIG. 1 obtains data in which auxiliary information may be present (e.g., suspect data) and attempts to extract the auxiliary information based on the method used by the auxiliary data encoder 106 to encode auxiliary data into text data. In some examples, the auxiliary data decoder 108 attempts to extract auxiliary data from the suspect data using multiple decoding methods, each decoding method being based on a method used by the auxiliary data encoder 106 to encode data. The auxiliary data decoder 108 may obtain data to be decoded when, for example, the obtained data is suspected of having been distributed without authorization and/or the owner or source of the obtained data is to be demonstrated.

The example auxiliary data manager 110 of FIG. 1 provides auxiliary information to the auxiliary data encoder 106, which encodes the auxiliary information into text data. The example auxiliary data manager 110 also receives extracted auxiliary information from the auxiliary data decoder 108. The auxiliary data manager 110 compares extracted auxiliary information to auxiliary information provided to the auxiliary data encoder 106 to determine whether a match exists between auxiliary information provided to the auxiliary data encoder and auxiliary information extracted by the auxiliary data decoder 108. The example auxiliary data manager 110 maintains (e.g., logs) a record of the parties to whom data is distributed and the auxiliary information encoded into the data provided to the parties. Thus, the example auxiliary data manager 110 can determine a party to whom data including a particular watermark was distributed. In some examples, the auxiliary data manager 110 identifies the data as having been distributed from the database 102 or otherwise encoded via the auxiliary data encoder 106 when a match exists between auxiliary information provided to the auxiliary data encoder and auxiliary information extracted by the auxiliary data decoder 108.

Figure 2:
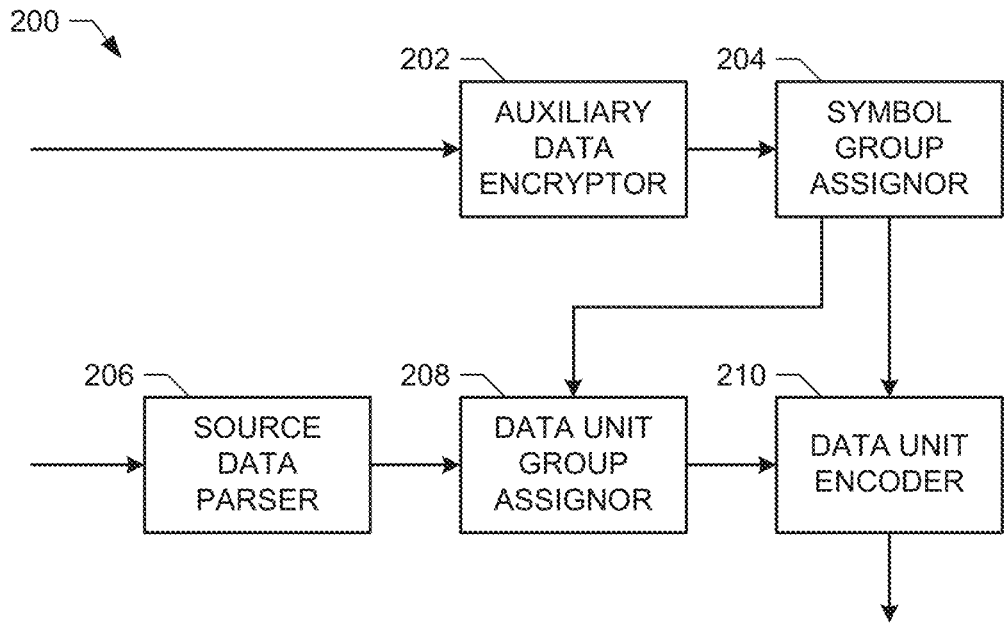
FIG. 2 is a more detailed block diagram of an example auxiliary data encoder to implement the system of FIG. 1 in accordance with the teachings of this disclosure.

FIG. 2 is a more detailed block diagram of an example auxiliary data encoder 200 to implement the system 100 of FIG. 1. The example auxiliary data encoder 200 of FIG. 2 may implement the auxiliary data encoder 106 of FIG. 1 to encode auxiliary data into source text data. Source data, as used herein, refers to data into which auxiliary information is to be encoded. Example source data may include lists of items, survey data, and/or any other type of data that may be represented by sets of text. In the example of FIG. 2, the auxiliary data encoder 200 encodes the auxiliary information in the source data in a binary format.

The auxiliary data encoder 200 of the illustrated example includes an auxiliary data encryptor 202, a symbol group assignor 204, a source data parser 206, a data group assignor 208, and a data unit encoder 210. The example auxiliary data encryptor 202 receives or otherwise obtains auxiliary data to be encoded into source data (e.g., from the auxiliary data manager 110 of FIG. 1). The example source data parser 206 receives or obtains source data including text (e.g., from the database 102 of FIG. 1). In some examples, the source data parser 206 serially receives data units and the auxiliary data encryptor 202 receives a string or other data to be encoded into the source data. Examples of source data, auxiliary data, and encoding the auxiliary data into the source data are described below with reference to FIGS. 4, 5, and 6.

The example auxiliary data encryptor 202 encrypts received auxiliary data. Encryption may be performed using any encryption method. In some examples, the auxiliary data encryptor 202 receives a key to be used for encrypting the auxiliary data. By encrypting auxiliary data, the example auxiliary data encryptor makes the auxiliary data more difficult to detect in the encoded data relative to unencrypted auxiliary data.

The auxiliary data encryptor 202 provides the encrypted data to the symbol group assignor 204. The symbol group assignor 204 determines a number of groups to represent the encrypted data. In some examples, each bit of the encrypted data corresponds to a symbol and is represented by one group. In some other examples, multiple bits of the encrypted data correspond to each symbol and are represented by each group. In some examples, different symbols represent different numbers of bits, and are assigned to groups that represent the number of bits represented by the symbol. In other words, in an example, some symbols may represent 1 bit and some other symbols may represent 2 bits. The different bit rates of the symbols may be used to increase the robustness of the encoding, to increase the data encoded in the source data, and/or some combination thereof. The symbols are encoded in the source data according to the groups to which the source data is assigned, as described below.

The groups are provided with a designated order. For example, 4 groups designated G0, G1, G2, and G3 may be arranged in order from least significant symbol (e.g., least significant bit, least significant bits, least significant word, etc.) to most significant symbol (e.g., most significant bit, most significant bits, most significant word, etc). The order may be according to convention (e.g., least significant on the right, most significant on the left, or vice versa) or may be pseudorandom. In some examples, the order in which the groups are arranged for encoding is the same order in which the groups are arranged for decoding.

The example source data parser 206 of FIG. 2 receives the source data (e.g., data units) including text. In some examples, the source data parser 206 generates data units from text. Generating the data units from the text may be performed using any method, such as dividing the text into an arbitrary number of words and/or dividing the text by an arbitrary delimiter. In some examples, the source data parser 206 determines a number of designated characters in the source data. In some such examples, data units having different numbers of the designated characters are assigned to different sets of groups corresponding to different symbols (e.g., to implement variable bit rate encoding in the source data).

The example data unit group assignor 208 of FIG. 2 assigns data units to groups. As a result, distinct subsets of the data units are assigned to the groups, where the subsets do not overlap. For example, the data unit group assignor 208 of FIG. 2 applies a hash algorithm to each data unit to determine to which group the data unit is to be assigned. Any hash algorithm may be used to determine the group, provided that applying the hash algorithm or another hash algorithm determines the same group for the resulting encoded data as for the source data. The example data unit group assignor 208 of FIG. 2 uses characteristics of the data unit that are not subject to change by the encoding process, such as the values of selected character(s) in the data unit, to evaluate the hash algorithm. In some examples, the hash algorithm is based on characteristics of the data unit that may be subject to change by the encoding process, and the decoding process includes a complementary hash algorithm that takes into account the potential changes and/or is agnostic to such changes. In the example of FIG. 2, the data unit group assignor 208 uses a hash algorithm selected to assign approximately equal numbers of data units to each of the groups.

The example data unit group assignor 208 uses a hash algorithm including a modulo operator to limit the results of the hash algorithm to be within the set of groups. To this end, the example data unit group assignor 208 may receive a number of groups from the symbol group assignor 204. The number of groups is implemented in the hash algorithm to assign the data units to the groups. An example of a hash algorithm that may be used by the data unit group assignor 208 to assign the data units to groups is shown in Equation 1 below.

$$H(S)=(((31*7+W1L1)*31+W2L1)*31+SIZE)\%4 \qquad \text{(Eq. 1)}$$

In Equation 1, H(S) is the hash value of the source data unit S, W1L1 is a numeric value of the first letter of the first word in the data unit (e.g., the first letter in the data unit), W2L1 is the numeric value of the first letter of the second word in the data unit (e.g., the first letter after the first white space character), and SIZE is the length of the data unit (e.g., in characters). The modulo 4 (% 4) operator is used to assign the source data into corresponding ones of four groups.

Equation 1 assumes that there is at least one white space character in each data unit. Other equations may be used based on assumptions of more or fewer white spaces (e.g., by using different designated characters), different numbers of groups (e.g., by changing the modulo operator value), and/or other characteristics of the data units (e.g., by omitting the SIZE factor from the algorithm, by using alternative characteristics, etc.).

The example data unit encoder 210 receives source data and identifications of groups to which the source data are assigned from the data unit group assignor 208 and receives the symbols assigned to the identified groups from the symbol group assignor 204. The data unit encoder 210 encodes the symbols in the source data to generate encoded data. For example, the data unit encoder 210 may replace one or more characters in a data unit with alternative, visually similar characters based on the symbol to be encoded. Additionally or alternatively, the data unit encoder 210 may insert designated character(s) at location(s) in the data unit (e.g., at the end of the data unit) based on the symbol to be encoded. The data unit encoder 210 outputs the encoded data (e.g., to a requesting party, to be stored, etc.).

While the example auxiliary data encoder 200 of FIG. 2 includes the auxiliary data encryptor 202, other auxiliary data encoders 200 omit the auxiliary data encryptor 202 and encode unencrypted auxiliary data into the source data. In such examples, the symbol group assignor 204 receives the auxiliary data and assigns symbols representative of the unencrypted auxiliary data to the groups. Operational examples of the auxiliary data encoders 200 are described below with reference to FIGS. 4-6.

Figure 3:
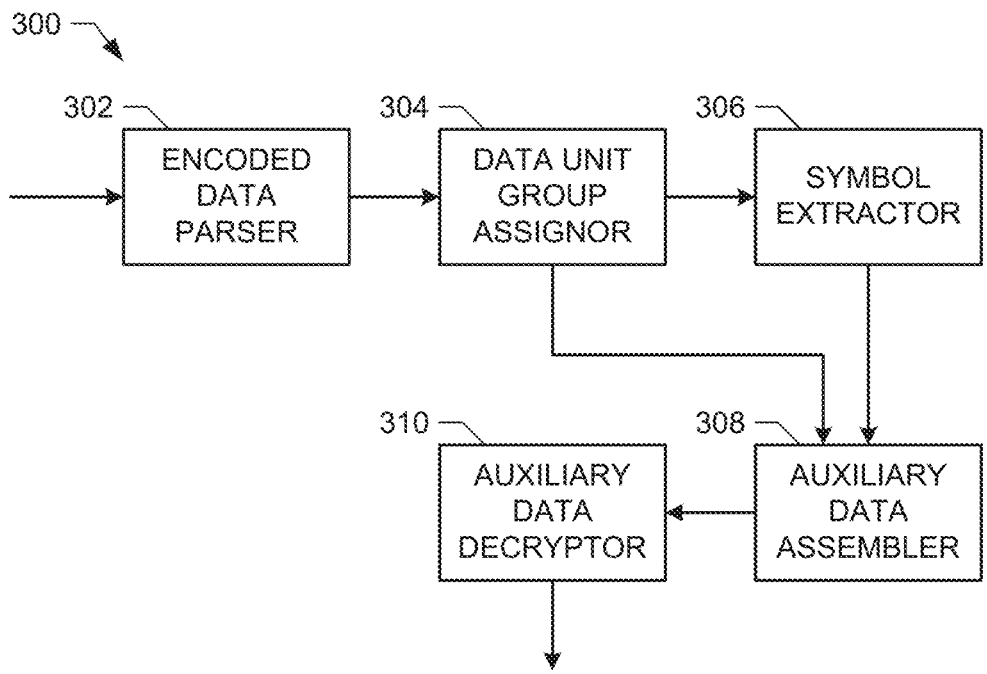
FIG. 3 is a more detailed block diagram of an example auxiliary data decoder to implement the system of FIG. 1 in accordance with the teachings of this disclosure.

FIG. 3 is a more detailed block diagram of an example auxiliary data decoder 300 to implement the system 100 of FIG. 1. The example auxiliary data decoder 300 of FIG. 3 may implement the auxiliary data decoder 108 of FIG. 1 to extract or decode auxiliary data from encoded data including text. The auxiliary data decoder 300 of the illustrated example includes an encoded data parser 302, a data unit group assignor 304, a symbol extractor 306, an auxiliary data assembler 308, and an auxiliary data decryptor 310.

The example encoded data parser 302 of FIG. 3 obtains encoded data (or data suspected of containing encoded auxiliary data). For example, a set or subset of numeric data (e.g., measurement data) that is suspected (or known) to have been owned or sourced by a first party is found in the possession of another party not authorized to possess the data. In some examples, the encoded data parser 302 generates data units from the source data, while in other examples the encoded data parser 302 receives or obtains the source data as data units.

The example encoded data parser 302 provides the data units to the data unit group assignor 304. The example data unit group assignor 304 of FIG. 3 assigns the data units to groups. In some examples, the data unit group assignor 304 uses the same method of group assignment (e.g., the same hash algorithm) as used by a corresponding data unit group assignor of an auxiliary data encoder (e.g., the 208 data unit group assignor of the auxiliary data encoder 208 of FIG. 2). In some other examples, the data unit group assignor 304 of FIG. 3 uses a complementary algorithm to the algorithm used by the data unit group assignor 208 to assign the encoded data units to the same respective groups as the corresponding source data units.

The example symbol extractor 306 of FIG. 3 extracts a symbol from the data unit. For example, the symbol extractor 306 may search for the presence and/or absence of designated characters in the data unit. In an example in which a first white space character corresponds to a '1' bit and a second white space character corresponds to a '0' bit, the symbol extractor 306 may determine the symbol in the data unit to be a sequence of bits based on a series of the first and/or second white space characters. In another example in which the presence of a white space at a designated location in a data unit (e.g., at the end of the data unit) corresponds to a '1' bit and the absence of such a white space corresponds to a '0' bit, the symbol extractor 306 extracts a symbol from a data unit by determining whether the white space is present at the designated location.

The example auxiliary data assembler 308 of FIG. 3 receives extracted symbols from the symbol extractor 306 and corresponding assigned groups from the data unit group assignor 304. The example auxiliary data assembler 308 assembles the auxiliary data by arranging the symbols in the locations designated by the groups. In the example of FIG. 3, each group corresponds to bit(s) in a particular location or position in the auxiliary data. In particular, the example groups assigned by the data unit group extractor 304 correspond to the same positions assigned by the data unit group assignor 208 of FIG. 2. In some other examples, the group locations or positions assigned by the data unit group extractor 304 differ from the assigned groups in a deterministic (e.g., pseudorandom) manner. In these examples, the auxiliary data assembler 308 determines the group locations or positions used during encoding from the group locations assigned during decoding.

The example auxiliary data assembler 308 provides the assembled auxiliary data to the auxiliary data decryptor 310. The example auxiliary data decryptor 310 decrypts the assembled auxiliary data to obtain decrypted auxiliary data (e.g., the original auxiliary data to be encoded in the source data). The example auxiliary data decryptor 310 outputs the decrypted auxiliary data (e.g., to the auxiliary data manager 110 of FIG. 1). The decrypted auxiliary data may then be used to compare to previously-encoded auxiliary data and/or read to obtain information encoded as auxiliary data.

Figure 4:
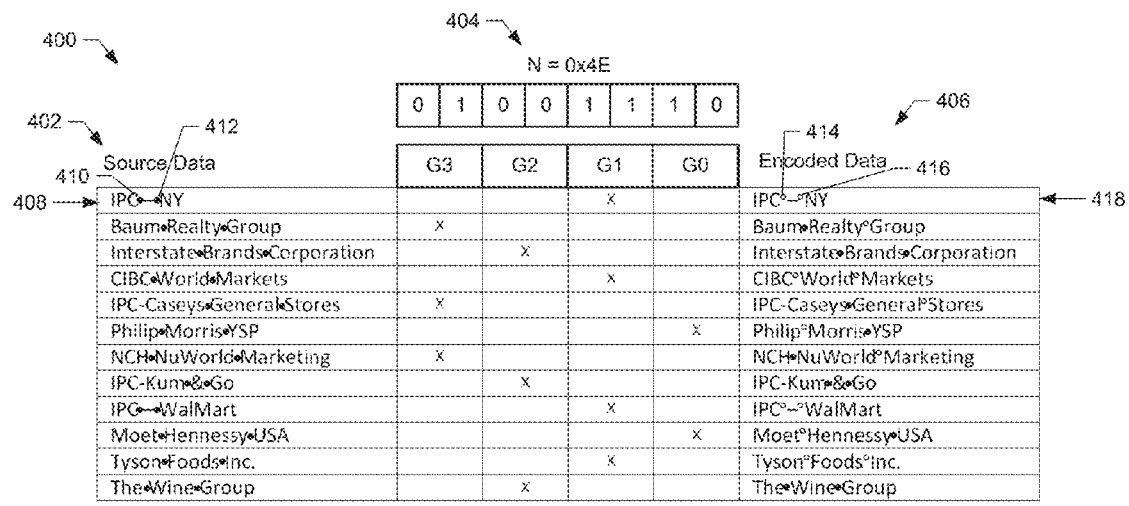
FIG. 4 is a table illustrating example source data, auxiliary data, and resulting encoded data in accordance with the teachings of this disclosure.

FIG. 4 is a table 400 illustrating example source data 402, auxiliary data 404, and resulting encoded data 406. The example source data 402, auxiliary data 404, and resulting encoded data 406 are described with reference to FIGS. 2 and 3 to illustrate an example of encoding of the auxiliary data 404 into the source data 402 by the auxiliary data encoder 200 of FIG. 2, and an example of obtaining the auxiliary data 404 from the encoded data 406. For the sake of clarity, the example auxiliary data 404 is not encrypted in the example of FIG. 4.

The example source data 402 of FIG. 4 are data units including text information such as combinations of alphanumeric characters, punctuation characters, and white space(s). In the example of FIG. 4, each data unit of the source data 402 includes two white spaces. The white spaces in the source data 402 are initially encoded as U+0020 white space characters, and are illustrated in FIG. 4 as solid black dots for visibility. Using the two white spaces, each data unit in the source data 402 may be encoded with a symbol representative of two bits of information (e.g., two bits of auxiliary data).

The auxiliary data 404 to be encoded in the example source data 402 in the example of FIG. 4 is an ASCII character encoding of the letter "N," which is the hexadecimal number 0x4E, or the binary number 01001110. By encoding two of the bits of information into each data unit in the source data 402, the example auxiliary data 404 may be completely represented by assigning the data units to respective ones of four groups (G0, G1, G2, and G3). The example data unit group assignor 208 of FIG. 2 applies a hash algorithm to each of the data units in the source data 402 to assign the data units to ones of the groups G0-G3. In the example of FIG. 4, the data units are assigned to the groups G0-G3 by applying the example Equation 1 above, where W1L1 and W2L1 are expressed as the numerical values of the ASCII decimal code representative of the respective letters (e.g., I=73, hyphen=45, etc.). For example, applying Equation 1 to one of the source data units 408 results in an assignment of the source data unit 408 to Group G1. The resulting assignments of the source data to the groups G0-G3 are illustrated in the table as X's in the row of a data unit and the column of the group G0-G3 to which it is assigned.

In the example of FIG. 4, the symbol group assignor 204 of FIG. 2 arranges the groups G0-G3 order from G0 as the least significant bits to G3 as the most significant bits of the auxiliary information. Thus, the data unit encoder 210 of FIG. 2 encodes a symbol corresponding to the least significant bits of the auxiliary data 404 (e.g., the bits '10') in the data units of the source data 402 assigned to group G0. Similarly, the data unit encoder 210 of FIG. 2 encodes symbols corresponding to bits '11,' '00,' and '01' in the data units of the source data 402 assigned to groups G1, G2, and G3, respectively.

The example data unit encoder 210 designates the location of the most significant bit (e.g., the leftmost bit) of a symbol as the leftmost white space and designates the location of the least significant bit (e.g., the rightmost bit) of the symbol as the rightmost white space. To encode a '0' bit into a data unit, the example data unit encoder 210 permits the designated white space corresponding to the bit to remain as a U+0020 encoded white space. In contrast, to encode a '1' bit into a data unit, the example data unit encoder 210 replaces the designated white space with a U+00A0 encoded white space. Therefore, for example, the data unit encoder 210 replaces both white spaces in data units assigned to group G1 (e.g., symbol '11') with U+00A0 white spaces (e.g., replaces the white spaces 410, 412 in the source data unit 408 with white spaces 414, 416 in an encoded data unit 418). The resulting encoded data units 418 represent the symbol '11.' Similarly, the data unit encoder 210 replaces the rightmost white space in data units assigned to group G3 (e.g., symbol '01') with U+00A0 white spaces, while leaving the leftmost white space in these data units as a U+0020 white space. The example data unit encoder 210 leaves both whites space in data units assigned to group G2 (e.g., symbol '00') as U+0020 white spaces. The example data unit encoder 210 replaces the leftmost white space in data units assigned to group G0 (e.g., symbol '01') with U+00A0 white spaces, while leaving the leftmost white space in these data units as a U+0020 white space.

The U+0020 encoded white space and the U+00A0 encoded white space are visually similar and are treated as the same character for purposes such as searching in many software programs. As a result, the encoded data features identical or substantially identical visual appearance and functionality as the source data and reduces detectability of the watermark.

To obtain the auxiliary data 404 from the encoded data, the example data unit group assignor 304 of FIG. 3 assigns the data units of the encoded data 406 to the groups G0-G3. The example data unit group assignor 304 uses the same hash algorithm (e.g., Equation 1) as used by the data unit group assignor 208 to assign the data units of the source data 402 to the groups G0-G3. As a result, the data units of the encoded data 406 are assigned to the same groups G0-G3 as the corresponding data units of the source data 402. The example symbol extractor 306 extracts the symbols from the example data units in the encoded data. In the example of FIG. 4, the symbol extractor 306 determines the encodings representing the white spaces of the data units to construct the symbols. For example, if both white spaces in a data unit of the encoded data 406 are U+00A0 encoded white spaces, the symbol extractor 306 determines the symbol to be '11.'

The example auxiliary data assembler 308 assembles the auxiliary data 404 by placing the extracted symbol of a data unit (e.g., from the symbol extractor 306) into the positions corresponding to the group assigned to that data unit. For example, the auxiliary data assembler 308 places the symbol '11' extracted from an encoded data unit assigned to group G1, into the bit locations designated for group G1. The example auxiliary data assembler 308 assembles the complete auxiliary data by placing the symbols for the other groups G0, G2, and G3 into their respective bit locations. The example auxiliary data assembler 308 then outputs the resulting auxiliary data for, for example, matching with auxiliary data previously encoded into source data.

In the example of FIG. 4, the auxiliary data 404 may be obtained from as few as 4 data units of the encoded data. In this manner, the example encoding/decoding method disclosed herein can be very robust in that the auxiliary data or watermark can be obtained from even relatively small subsets of the data. In some examples the auxiliary data decoder 300 of FIG. 3 iterates the method for additional ones of the encoded data units to, for example, perform error checking, to reduce the likelihood that a false positive has occurred, and/or to determine an extent to which a data set includes the encoded data 406.

Figure 5:
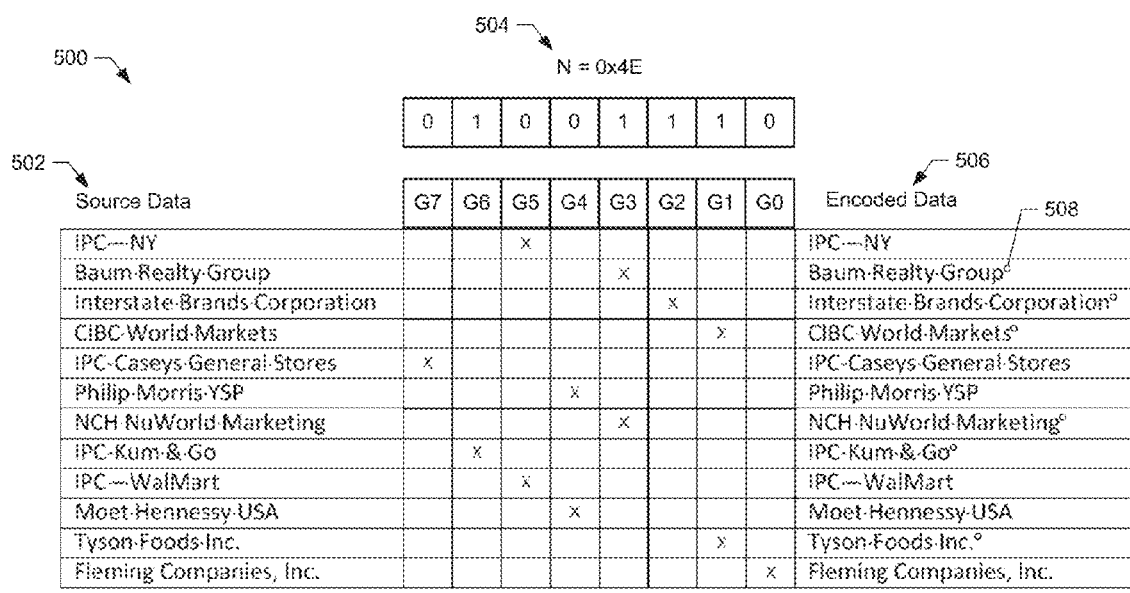
FIG. 5 is a table illustrating another example of source data, auxiliary data, and resulting encoded data in accordance with the teachings of this disclosure.

FIG. 5 is a table 500 illustrating another example of source data 502, auxiliary data 504, and resulting encoded data 506. In the example of FIG. 5, the source data 502, the encoded data 506, and symbols representative of the auxiliary data 504 are assigned to ones of 8 groups G0-G7. As a result, the example auxiliary data 504 is represented by symbols of 1 bit each, and the groups G0-G7 are arranged in order from G0 as the least significant bit to G7 as the most significant bit of the auxiliary data 504.

In contrast to the example of FIG. 4, the example data unit encoder 210 of FIG. 2 encodes the symbols into the source data 502 by selectively inserting or including a designated character (e.g., a white space 508) at a designated location in the data unit (e.g., at the end of the data unit) based on the value of the symbol to be encoded. For example, for data units of the source data 502 that are assigned to one of groups G1, G2, G3, or G6 (e.g., groups assigned the symbol '1'), the example data unit encoder 210 includes the designated character at the designated location (e.g., adds a white space at the end of the data unit). In contrast, for data units of the source data 502 that are assigned to one of groups G0, G4, G5, or G7 (e.g., groups assigned the symbol '0'), the example data unit encoder 210 does not include the designated character.

In some examples, the designated character is a character that is not easily visible in the data and/or is not easily recognizable. For example, the designated character may be a U+00A0 white space selectively added to the end of the data units.

To obtain the auxiliary data 504 from the example encoded data 506 of FIG. 5, the example symbol extractor 306 of FIG. 3 determines whether the designated character (e.g., a white space) is present at a designated location (e.g., at the end) in a data unit in the encoded data. If the designated character is present, the example symbol extractor 306 determines that the symbol is a '1.' Conversely, if the designated character is not present, the symbol extractor 306 determines that the symbol is a '0.' The example auxiliary data assembler 308 assembles the auxiliary data 504 by placing the extracted symbols from the data units into locations based on the respective assigned groups G0-G7 for the data units.

The example encoding scheme of FIG. 5 is less robust than the encoding scheme of FIG. 4 due to the larger number of groups, which requires a larger number of encoded data units to obtain the encoded data. However, unlike the scheme of FIG. 4 which uses data having a particular designated character in the source data 402 (e.g., at least two white spaces or other designated character), the example encoding scheme of FIG. 5 may be implemented by selectively inserting a character at a designated location in the source data 502 regardless of the content of the source data 502. As a result, the example scheme of FIG. 5 may be implemented to be agnostic as to the content of the source data 502 and, therefore, to enable use of a larger portion of available source data 502 for encoding the auxiliary data 504.

FIG. 6 is a table 600 illustrating another example of source data 602, auxiliary data 604, and resulting encoded data 606. In the example of FIG. 6, the auxiliary data 604 is larger (e.g., contains more information) than the auxiliary data 404, 504 of FIGS. 4 and 5. The auxiliary data 604 includes 3 ASCII encoded characters NCD, which correspond to the hexadecimal value 0x4E4344, or the binary value 010011100100001101000100. The example symbol group assignor 204 of FIG. 2 assigns 3-bit symbols to each of 8 groups G0-G7. The example groups G0-G7 of FIG. 6 are arranged in order from G0 as the least significant symbol to G7 as the most significant symbol.

The example source data 602 of FIG. 6 includes data units that each contains at least 3 white space encoded characters (e.g., U+0020 encoded characters). The example source data parser 206 of FIG. 2 may identify and select these data units for encoding using the example scheme of FIG. 6, while selecting data units having other numbers of the designated character for other encoding schemes. The example data unit group assignor 208 of FIG. 2 assigns the data units to the example groups G0-G7 based on the example hash algorithm of Equation 1 above (or another algorithm).

The example data unit encoder 210 encodes a symbol into each data unit based on the group G0-G7 to which that data unit is assigned and the symbol assigned to that group. To encode a symbol, the example data unit encoder 210 designates one of the designated characters (e.g., white spaces) to each of the bits in the symbol. For example, the data unit encoder 210 may correlate the least significant bit of the 3-bit symbol to the rightmost white space (e.g., a white space 608 of a source data unit 610), the second least significant bit to the middle white space (e.g., a white space 612 of the source data unit 610), and the most significant bit to the leftmost white space (e.g., a white space 614 of the source data unit 610). To encode a '1' bit, the example data unit encoder 210 replaces the corresponding white space character in the source data with a U+00A0 character (e.g., white spaces 616, 618 of an encoded data unit 620). To encode a '0' bit, the example data unit encoder 210 does not replace the corresponding white space character (e.g., white space 622 of the encoded data unit 620) or replaces the corresponding white space character with a third character.

In the examples described above, the groups G0-G7 have the same correlations of bits to designated characters. However, in some examples, different groups may have different correlations. For example, group G0 may correlate the least significant bit of the 3-bit symbol to the rightmost white space, the second least significant bit to the middle white space, and the most significant bit to the leftmost white space, while group G1 may correlate the most significant bit of the 3-bit symbol to the rightmost white space, the second least significant bit to the rightmost white space, and the most significant bit to the middle white space. The other groups G2-G7 may use the same or alternative correlations of bits to designated characters.

In the examples of FIGS. 4 and 6, the number of bits per symbol (e.g., the encoded bit rate) is equal to a number of the designated character present in each of the data units of the respective source data 402, 602 (e.g., 2 bits for 2 white spaces, 3 bits for 3 white spaces). In some other examples, the number of bits per symbol may be equal to and/or less than the number of the designated character present in some or all of the data. In other words, symbols of 2 bits may be assigned to data units having 2 or more white spaces. These examples enable data units having different numbers of a designated character to be encoded with the same bit at a higher bit rate than the example of FIG. 5.

Breaking spaces refer to spaces that permit line breaks to be inserted in the position of the space as determined to be necessary by a software program. In contrast, non-breaking spaces prevent such line-wrapping at the position of the non-breaking space in programs that support such functionality. The example auxiliary data encoder 200 of FIG. 2 preserves the searchability of the source data when using breaking white space encoded characters. In particular, breaking spaces enable independent words in a data unit to be searched, as well as words with spaces between them in many cases. In contrast, non-breaking spaces may not be searchable in some browsers, in some editors, and/or in databases. However, computer programs are trending toward compatibility with the non-breaking space, such that the non-breaking space characters will present less of a barrier to searchability in the future. Unicode and non-breaking spaces are searchable in programs such as Google Chrome™ version 22, and Microsoft® Word 2007, and when using regular expressions.

While example manners of implementing the system 100 of FIG. 1 has been illustrated in FIGS. 2 and/or 3, one or more of the elements, processes and/or devices illustrated in FIGS. 2 and/or 3 may be combined, divided, re-arranged, omitted, eliminated and/or implemented in any other way. Further, the example database 102, the example data request receiver 104, the example auxiliary data manager 110, the example auxiliary data encryptor 202, the example symbol group assignor 204, the example source data parser 206, the example data group assignor 208, the example data unit encoder 210, the example encoded data parser 302, the example data unit group assignor 304, the example symbol extractor 306, the example auxiliary data assembler 308, the example auxiliary data encryptor 310 and/or, more generally, the example auxiliary data encoder 106, 200 and/or the example auxiliary data decoder 108, 300 of FIGS. 1-3 may be implemented by hardware, software, firmware and/or any combination of hardware, software and/or firmware. Thus, for example, any of the example database 102, the example data request receiver 104, the example auxiliary data manager 110, the example auxiliary data encryptor 202, the example symbol group assignor 204, the example source data parser 206, the example data group assignor 208, the example data unit encoder 210, the example encoded data parser 302, the example data unit group assignor 304, the example symbol extractor 306, the example auxiliary data assembler 308, the example auxiliary data encryptor 310 and/or, more generally, the example auxiliary data encoder 106, 200 and/or the example auxiliary data decoder 108, 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example database 102, the example data request receiver 104, the example auxiliary data manager 110, the example auxiliary data encryptor 202, the example symbol group assignor 204, the example source data parser 206, the example data group assignor 208, the example data unit encoder 210, the example encoded data parser 302, the example data unit group assignor 304, the example symbol extractor 306, the example auxiliary data assembler 308, and/or the example auxiliary data encryptor 310 are hereby expressly defined to include a tangible computer readable storage medium such as a memory, DVD, CD, Blu-ray, etc. storing the software and/or firmware. Further still, the example the example auxiliary data encoder 106, 200 and/or the example auxiliary data decoder 108, 300 of FIGS. 1-3 may include one or more elements, processes and/or devices in addition to, or instead of, those illustrated in FIGS. 1-3, and/or may include more than one of any or all of the illustrated elements, processes and devices.

Figure 7:
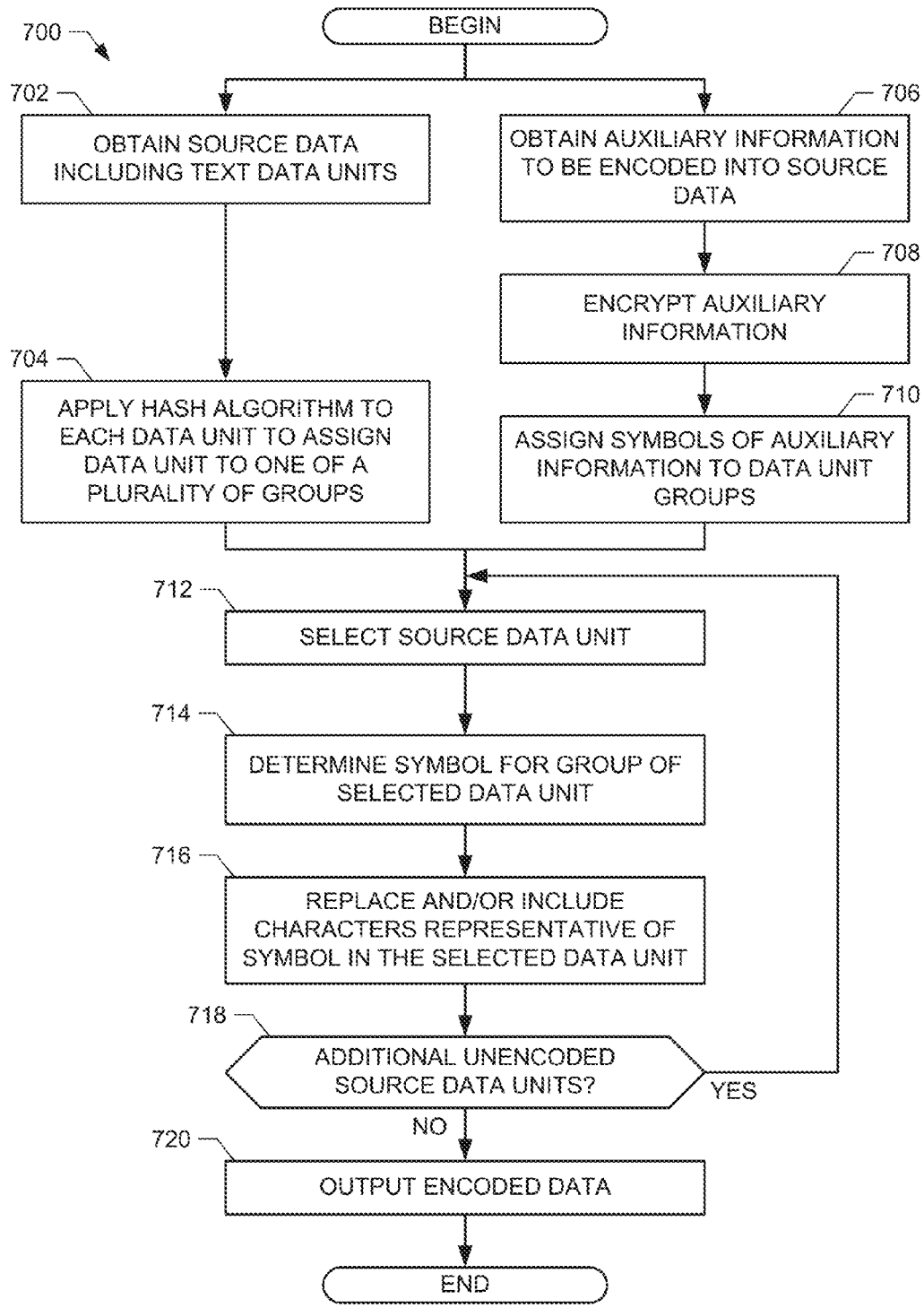
FIG. 7 is a flowchart representative of example machine readable instructions which may be executed to implement the auxiliary data encoder of FIG. 2 to encode auxiliary data into text data.
Figure 8:
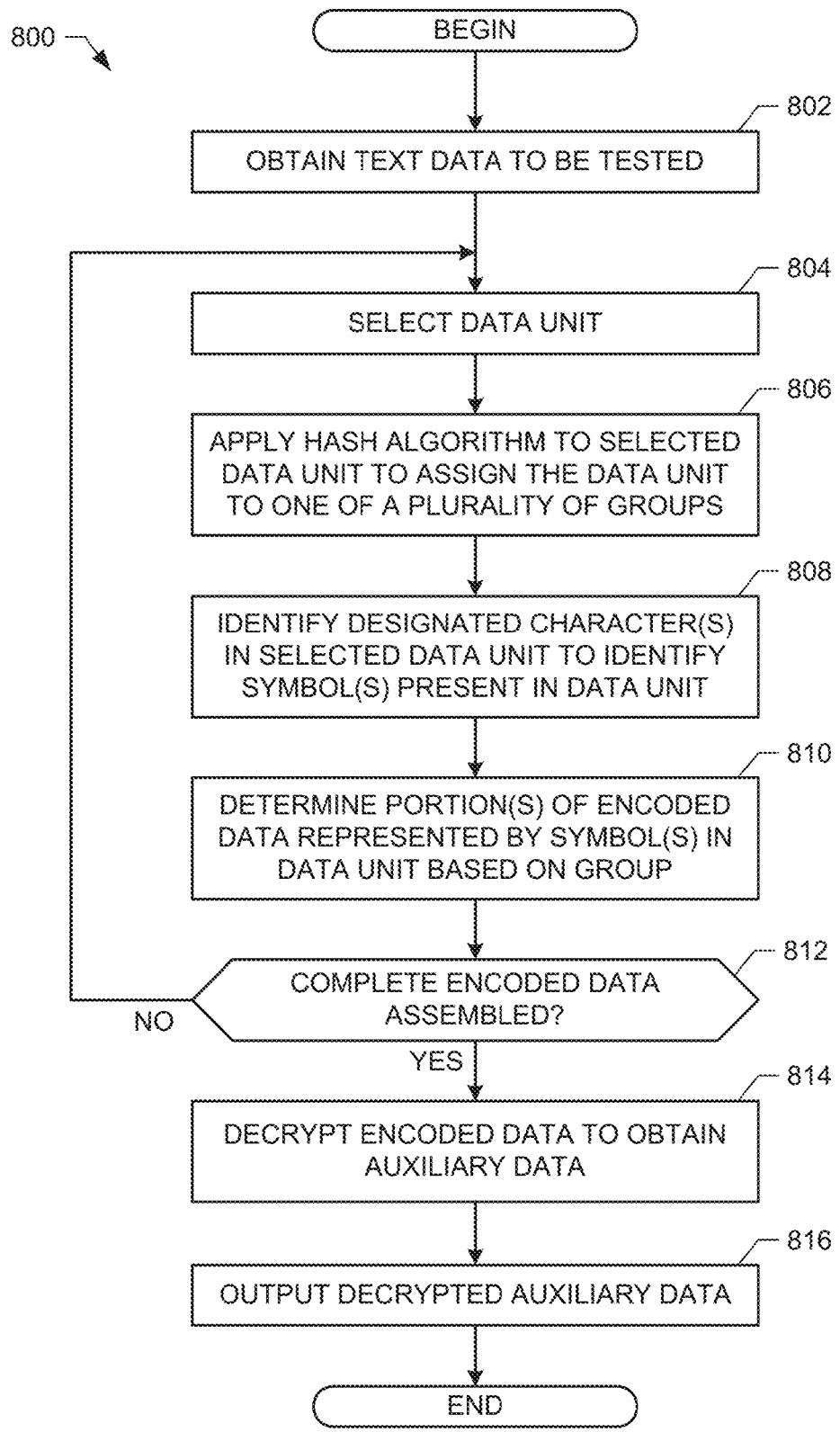
FIG. 8 is a flowchart representative of example machine readable instructions which may be executed to implement the auxiliary data decoder of FIG. 3 to obtain auxiliary data encoded into text data.

A flowchart representative of example machine readable instructions for implementing the example auxiliary data encoder 200 of FIG. 2 is shown in FIG. 7. A flowchart representative of example machine readable instructions for implementing the example auxiliary data decoder 300 of FIG. 3 is shown in FIG. 8. In this example, the machine readable instructions comprise programs for execution by a processor such as the processor 912 shown in the example computer 900 discussed below in connection with FIG. 9. The programs may be embodied in software stored on a tangible computer readable storage medium such as a CD-ROM, a floppy disk, a hard drive, a digital versatile disk (DVD), a Blu-ray disk, or a memory associated with the processor 912, but the entire programs and/or parts thereof could alternatively be executed by a device other than the processor 912 and/or embodied in firmware or dedicated hardware. Further, although the example programs are described with reference to the flowcharts illustrated in FIGS. 7 and 8, many other methods of implementing the example auxiliary data encoder 200 and/or the example auxiliary data decoder 300 may alternatively be used. For example, the order of execution of the blocks may be changed, and/or some of the blocks described may be changed, eliminated, or combined.

As mentioned above, the example processes of FIGS. 7-8 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example processes of FIGS. 7-8 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 7 is a flowchart representative of example machine readable instructions 700 which may be executed to implement the auxiliary data encoder 200 of FIG. 2 to encode auxiliary data into text data. The example instructions 700 may be performed, for example, to embed a watermark, such as an identifier or copyright information, into the text data prior to providing the text data to another party.

The example source data parser 206 of FIG. 2 obtains source data including text data units (block 702). In some examples, the source data parser 206 generates the data units from text data. The example data unit group assignor 208 of FIG. 2 applies a hash algorithm to each data unit (e.g., from the source data parser 206) to assign the data unit to one of a plurality of groups (block 704). For example, assigning the source data may include determining the one of the plurality of groups based on a characteristic of the source data (e.g., a designated letter of a designated word) that is not changed to generate the encoded data. An example hash algorithm is described in Equation 1 above, but any hash algorithm may be used to assign the data units to respective ones of the groups.

The example auxiliary data encryptor 202 obtains auxiliary information to be encoded into the source data (block 706). The auxiliary data encryptor 202 encrypts the auxiliary information (block 708). The example data unit group assignor 208 assigns symbols of the encrypted auxiliary information to respective data unit groups (e.g., the data unit groups to which the data units are assigned). In some examples, blocks 702-704 are performed in parallel with blocks 706-710.

The example data unit encoder 210 of FIG. 2 selects a source data unit (block 712). The example data unit encoder 210 determines a symbol for the group of the selected data unit (block 714). To encode the symbol in the data unit, the example data unit encoder 210 replaces and/or includes characters representative of the symbol in the selected data unit (block 716). For example, the data unit encoder 210 may selectively replace designated character(s) in the data unit (e.g., an encoded white space character) with character(s) representative of the symbol (e.g., a differently-encoded white space character). In another example, the data unit encoder 210 selectively adds character(s) representative of the symbol to a designated location in the data unit (e.g., at the end of the data unit).

The example data unit encoder 210 determines whether there are additional unencoded source data units (block 718). If there are additional unencoded source data units (block 718), control returns to block 712 to select another source data unit to be encoded. When there are no additional data units (block 718), the example data unit encoder 210 outputs the encoded data (block 720). The encoded data may, for example, be transmitted or stored for future transmission.

FIG. 8 is a flowchart representative of example machine readable instructions 800 which may be executed to implement the auxiliary data decoder 300 of FIG. 3 to obtain auxiliary data encoded into text data. The example instructions 800 of FIG. 8 may be performed to, for example, identify copyrighted data and/or to extract information such as a watermark that is encoded into text data.

The example encoded data parser 302 of FIG. 3 obtains text data to be tested (block 802). In some examples, the encoded data parser 302 generates data units from the obtained data. The example data unit group assignor 304 of FIG. 3 selects a data unit (block 804). The data unit group assignor 304 applies a hash algorithm to the selected data unit to assign the selected data unit to one of a plurality of groups (block 806).

The example symbol extractor 306 identifies designated character(s) in the selected data unit to identify symbol(s) in the selected data unit (block 808). Based on the group corresponding to the symbol(s), the example auxiliary data assembler 308 determines a portion of the encoded data represented by the symbol(s) in the data unit (block 810). For example, the auxiliary data assembler 308 may determine a placement of the symbol(s) within the encoded information based on a portion of the encoded information assigned to the symbol (e.g., an ordering of the groups).

The example auxiliary information assembler 308 determines whether the complete encoded data has been assembled (block 812). For example, the auxiliary information assembler 308 may determine whether a symbol has been extracted and placed for each group. If the complete encoded data has not been assembled (block 812), control returns to block 804 to select another data unit. If the complete encoded data has been assembled (block 812), the example auxiliary data decryptor 310 decrypts the encoded data to obtain auxiliary data (block 814). The example auxiliary data decryptor 310 outputs the decrypted auxiliary data (block 816). For example, the decrypted auxiliary data may be used for comparison to auxiliary data encoded into source data to determine a match and/or to obtain information encoded into the data.

Figure 9:
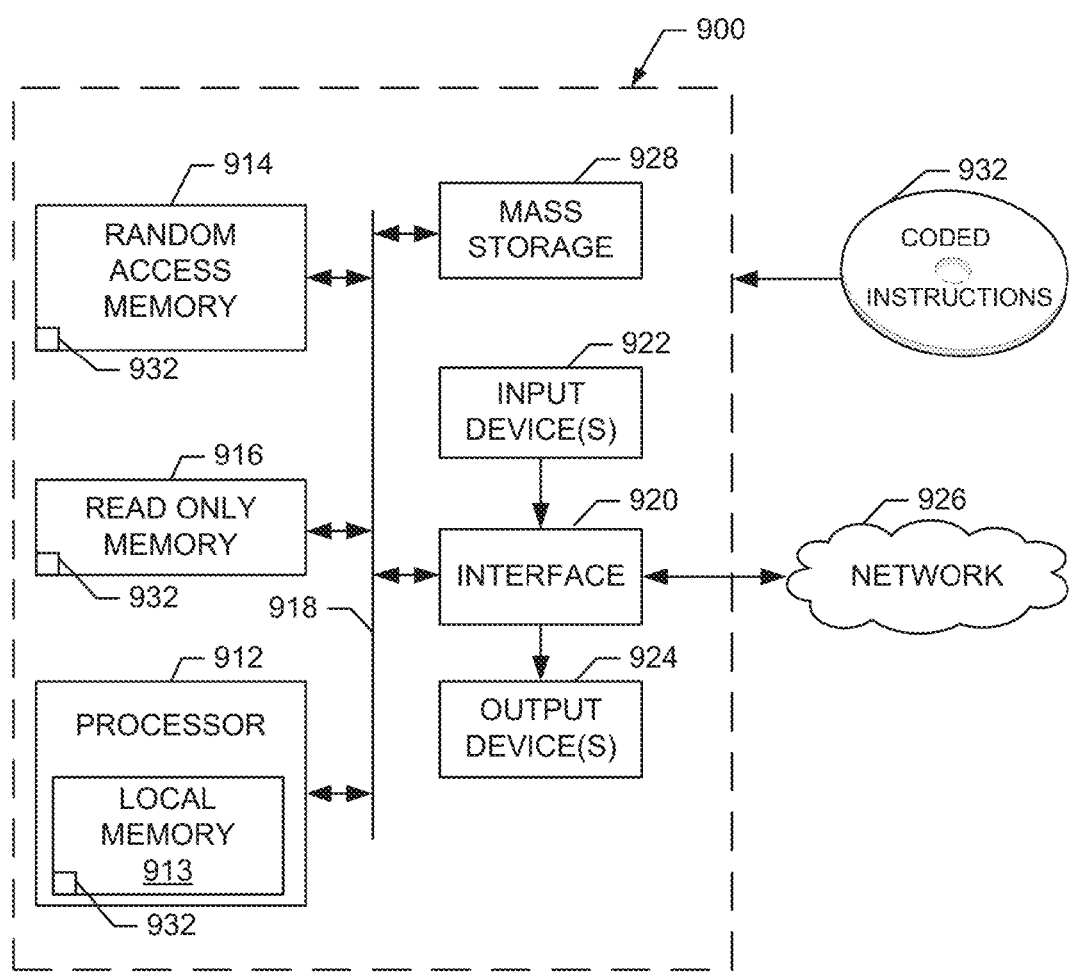
FIG. 9 is a block diagram of an example computer capable of executing the instructions of FIGS. 7-8 to implement the apparatus of FIGS. 2 and/or 3.

FIG. 9 is a block diagram of an example computer 900 capable of executing the instructions of FIGS. 7 and/or 8 to implement the auxiliary data encoder 200 and/or the auxiliary data decoder 300 of FIGS. 1-3. The computer 900 can be, for example, a server, a personal computer, an Internet appliance, or any other type of computing device.

The system 900 of the instant example includes a processor 912. For example, the processor 912 can be implemented by one or more microprocessors or controllers from any desired family or manufacturer.

The processor 912 includes a local memory 913 (e.g., a cache) and is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The computer 900 also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, a voice recognition system, and/or any other method of input or input device.

One or more output devices 924 are also connected to the interface circuit 920. The output devices 924 can be implemented, for example, by display devices (e.g., a liquid crystal display, a cathode ray tube display (CRT), a printer and/or speakers). The interface circuit 920, thus, typically includes a graphics driver card.

The interface circuit 920 also includes a communication device such as a modem or network interface card to facilitate exchange of data with external computers via a network 926 (e.g., an Ethernet connection, a digital subscriber line (DSL), a telephone line, coaxial cable, a cellular telephone system, etc.).

The computer 900 also includes one or more mass storage devices 928 for storing software and data. Examples of such mass storage devices 928 include floppy disk drives, hard drive disks, compact disk drives and digital versatile disk (DVD) drives. The mass storage device 928 may implement the database 102 of FIG. 1.

The coded instructions 932 of FIGS. 7 and/or 8 may be stored in the mass storage device 928, in the volatile memory 914, in the non-volatile memory 916, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to extract embedded auxiliary data from encoded source data, comprising:
    parsing, by executing an instruction with a processor, the encoded source data into encoded data units, the encoded data units including respective text data and white space, the auxiliary data having been embedded into the white space;
    applying, by executing an instruction with the processor, a hash algorithm to the text data of respective ones of the encoded data units to generate respective hash values for the ones of the respective encoded data units;
    respectively assigning, by executing an instruction with the processor, ones of the encoded data units to ones of a plurality of groups based on the respective hash values;
    identifying, by executing an instruction with the processor, symbols characterizing the white space of the ones of the encoded data units assigned to the ones of the plurality of groups, the symbols being associated with respective numerical values;
    respectively associating, by executing an instruction with the processor, the numerical values of the identified symbols with the ones of the plurality of groups; and
    assembling, by executing an instruction with the processor, the numerical values according to an ordering of the ones of the plurality of groups to extract the embedded auxiliary data, the assembled numerical values corresponding to the embedded auxiliary data.

2. The method as defined in claim 1, wherein the respectively assigning ones of the encoded data units to ones of the plurality of groups based on the respective hash values includes assigning a first one of the encoded data units to a first one of the groups.

3. The method as defined in claim 1, wherein the identifying of the symbols characterizing the white space of the ones of the encoded data units assigned to the ones of the plurality of groups includes identifying designated characters in the ones of the encoded data units, the designated characters respectively representing the symbols.

4. The method as defined in claim 1, wherein the identifying of the symbols characterizing the white space of the ones of the encoded data units assigned to the ones of the plurality of groups includes identifying an absence of a designated character in the ones of the encoded data units.

5. The method as defined in claim 1, wherein the symbols characterizing the white space of the ones of the encoded data units assigned to the ones of the plurality of groups include first and second symbols, the first symbols being associated with a first numerical value and the second symbols being associated with a second numerical value.

6. The method as defined in claim 1, wherein the assembled numerical values represent a letter.

7. The method as defined in claim 1, wherein the text data of each of the encoded data units has a respective number of characters and wherein the respective hash values of the ones of the encoded data units are based on the number of characters in each of the encoded data units.

8. The method as defined in claim 1, wherein the respective hash values of the encoded data units are based on a designated letter of a designated word in the text data of each of the encoded data units.

9. The method as defined in claim 1, further including validating the embedded auxiliary data after being extracted by comparing the embedded auxiliary data to second auxiliary data embedded into known source data.

10. An apparatus to extract embedded auxiliary data from encoded source data, comprising:
    an encoded data parser implemented by a processor with a memory to parse encoded source data into encoded data units, the encoded data units including text data and white space, the auxiliary data having been embedded into the white space;
    a data unit group assignor implemented by the processor with the memory to:
        apply a hash algorithm to the text data of respective ones of the encoded data units to generate respective hash values for the ones of the encoded data units and
        assign the ones of the respective encoded data units to respective ones of a plurality of groups based on the respective hash values;
    a symbol extractor implemented by the processor with the memory to identify symbols characterizing the white space of the ones of the encoded data units assigned to ones of the plurality of groups, the symbols being associated with respective numerical values; and
    an auxiliary data assembler implemented by the processor with the memory to respectively associate the numerical values of the identified symbols with the ones of the plurality of groups and to assemble the numerical values according to an ordering of the ones of the plurality of groups to extract the embedded auxiliary data, the assembled numerical values corresponding to the embedded auxiliary data.

11. The apparatus as defined in claim 10, wherein the data unit group assignor is further to assign a first one of the encoded data units to a first one of the groups.

12. The apparatus as defined in claim 10, wherein the symbol extractor is further to identify designated characters in the ones of the encoded data units, the designated characters representing the symbols.

13. The apparatus as defined in claim 10, wherein the symbol extractor is to identify the symbols present in the white space of the ones of the encoded data units by identifying designated character characters in the ones of the encoded data units, the designated characters respectively representing the symbols.

14. The apparatus as defined in claim 10, wherein the symbol extractor is further to identify an absence of designated characters in the ones of the encoded data units.

15. The apparatus as defined in claim 10, wherein the symbol extractor is further to identify a first and second symbols of the symbols characterizing the white space of the ones of the encoded data units assigned to the ones of the plurality of groups, the first symbols being associated with a first numerical value and the second symbols being associated with a second numerical value, and to associate the first and second numerical values with first and second ones of the plurality of groups.

16. The apparatus as defined in claim 10, further comprising an auxiliary data decryptor implemented by the processor with the memory to decrypt the assembled numerical values into a letter.

17. The apparatus as defined in claim 10, wherein the respective hash values of the ones of the encoded data units are based on a number of text data characters in each of the encoded data units.

18. The apparatus as defined in claim 10, wherein the auxiliary data assembler is further to validate the embedded auxiliary data after being extracted when the embedded auxiliary data matches second auxiliary data encrypted embedded into source data.

19. A tangible computer readable storage medium comprising computer readable instructions which, when executed, cause a processor to at least:
    parse encoded source data into encoded data units, the encoded data units including respective text data and white space, auxiliary data having been embedded into the white space;
    apply a hash algorithm to the text data of respective ones of the encoded data units to generate respective hash values for the ones of the encoded data units;
    respectively assign ones of the encoded data units to ones of a plurality of groups based on the respective hash values;
    identify symbols characterizing the white space of the ones of the encoded data units assigned to the ones of the plurality of groups, the symbols being associated with respective numerical values;
    respectively associate the numerical values of the identified symbols with the ones of the plurality of groups; and
    assemble the numerical values according to an ordering of the ones of the plurality of groups to extract the embedded auxiliary data, the assembled numerical values corresponding to the embedded auxiliary data.

20. The tangible computer readable storage medium as defined in claim 19, wherein the instructions further cause the processor to assign a first one of the encoded data units to a first one of the plurality of groups.

21. The tangible computer readable storage medium as defined in claim 19, wherein the instructions further cause the processor to identify the symbols by identifying designated character characters in the ones of the encoded data units, the designated character characters representing the symbol symbols.

22. The tangible computer readable storage medium as defined in claim 19, wherein the instructions further cause the processor to identify the symbols by identifying an absence of a designated character in the ones of the encoded data units.

23. The tangible computer readable storage medium as defined in claim 19, wherein the instructions further cause the processor to identify auxiliary data embedded in the ones of the encoded data units based on the respectively assigned groups of the ones of the encoded data units.

24. The tangible computer readable storage medium as defined in claim 19, wherein the instructions further cause the processor to identify first and second symbols present in the symbols characterizing the white space of the ones of the encoded data units assigned to the ones of the plurality of groups, the instructions to cause the processor to identify the auxiliary data by assembling the auxiliary data from the first and second symbols.

25. The tangible computer readable storage medium as defined in claim 19, wherein the assembled numerical values represent a letter.

26. The tangible computer readable storage medium as defined in claim 19, wherein the instructions are to cause the processor to validate the embedded auxiliary data after being extracted when the embedded auxiliary data matches second auxiliary data embedded into known source data.

27. The tangible computer readable storage medium as defined in claim 19, wherein the text data of each of the encoded data units has a respective number of characters and wherein the respective hash values are based on the respective number of characters in the encoded data units.

28. The tangible computer readable storage medium as defined in claim 19, wherein the respective hash values are based on a designated letter of a designated word in the text data of each of the encoded data units.

* * * * *